United States Patent [19]

Tyree, Jr.

[11] Patent Number: 6,006,525
[45] Date of Patent: Dec. 28, 1999

[54] VERY LOW NPSH CRYOGENIC PUMP AND MOBILE LNG STATION

[76] Inventor: Lewis Tyree, Jr., 115 Liberty Hall Rd., Lexington, Va. 24450

[21] Appl. No.: 09/100,420

[22] Filed: Jun. 20, 1998

Related U.S. Application Data

[60] Provisional application No. 60/050,269, Jun. 20, 1997.

[51] Int. Cl.[6] .............................. F17C 13/00; F17C 9/04; F25B 27/00
[52] U.S. Cl. ............................. 62/50.6; 62/50.7; 62/55.5; 62/50.3; 62/239; 62/323.2
[58] Field of Search .................................. 62/50.1, 50.6, 62/50.7, 55.5, 50.3, 53.2, 239, 331, 323.1, 323.2; 417/901, 546

[56] References Cited

U.S. PATENT DOCUMENTS

| | | |
|---|---|---|
| 3,011,480 | 12/1961 | Tyree, Jr. . |
| 3,023,710 | 2/1962 | Tyree, Jr. . |
| 3,263,622 | 8/1966 | Tyree, Jr. . |
| 3,277,797 | 10/1966 | Tyree, Jr. et al. . |
| 3,430,576 | 3/1969 | Tyree, Jr. . |
| 3,823,568 | 7/1974 | Bijasiewicz et al. . |
| 4,186,562 | 2/1980 | Tyree, Jr. . |
| 4,224,801 | 9/1980 | Tyree, Jr. . |
| 4,418,544 | 12/1983 | Heybutski, et al. . |
| 4,472,946 | 9/1984 | Zwick . |
| 4,593,835 | 6/1986 | Kikkawa et al. . |
| 4,792,289 | 12/1988 | Nieratschker . |
| 4,860,545 | 8/1989 | Zwick . |
| 4,995,234 | 2/1991 | Kooy et al. . |
| 5,188,519 | 2/1993 | Spulgis . |
| 5,511,955 | 4/1996 | Brown et al. ............................ 417/259 |
| 5,513,961 | 5/1996 | Engdahl, et al. . |
| 5,537,828 | 7/1996 | Borcuch, et al. . |
| 5,575,626 | 11/1996 | Brown, et al. . |
| 5,819,544 | 10/1998 | Andonian . |
| 5,860,798 | 1/1999 | Tschopp ................................. 417/502 |

OTHER PUBLICATIONS

George Acker, Jr., C. Everett Brett, Walter J. Schaetzle, Yeong K Song —"LNG (Liquefied Natural Gas) as a Fuel and Refrigerant for Diesel Powered Shrimp Boats" Amer. Soc. of Mech. Engineers (Paper No. 88 –Ice–21) NYC, NY.

Small Business Innovation Research, Program Solicitation Doe/ER–0686, Closing Date Mar. 3, 1997 U.S. Dept. of Energy, Office of Energy Research, Germantown, MD 20874–1290 p. 62.

"Liquid Natural Gas Fuel Systems" MVE, Inc., Bloominton, MN pp. 4 & 5.

"Net Positive Suction Head Requirements for Cryogenic Pumps" Data Book, P/N 10517513 Aug. 1996 MVE, Inc., New Prague, MN 56071 p. 27.

Primary Examiner—William Doerrler

[57] ABSTRACT

A reciprocating cryogenic pump, suitable for medium and high pressures having very low net positive suction head (NPSH) requirements. The pump comprises a cylinder having both liquid inlets and vapor outlets, and two interacting pistons, each piston reciprocably movable within the cylinder, and each piston having flow conduits there through generally co-axial with the piston and with the cylinder. The conduit of one piston preferentially connects to the liquid inlets and the conduit of the other piston preferentially connects to the vapor outlets, which are at a higher elevation than the liquid inlets. Both conduits are selectively and mechanically opened to the pumping chamber by the reciprocating motion, and the pump is oriented to allow liquid flowing into the pumping chamber by the natural tendency of liquid to flow downwards and residual vapor to leave the pumping chamber by the natural tendency of vapor to flow upwards, an act that in encouraged by the conduit connecting to the vapor outlets being opened before the conduit connecting to the liquid inlets. One use of this pump is for any on-board, mobile (truck, rail or ship), LNG fuel systems for Diesel engines.

27 Claims, 4 Drawing Sheets

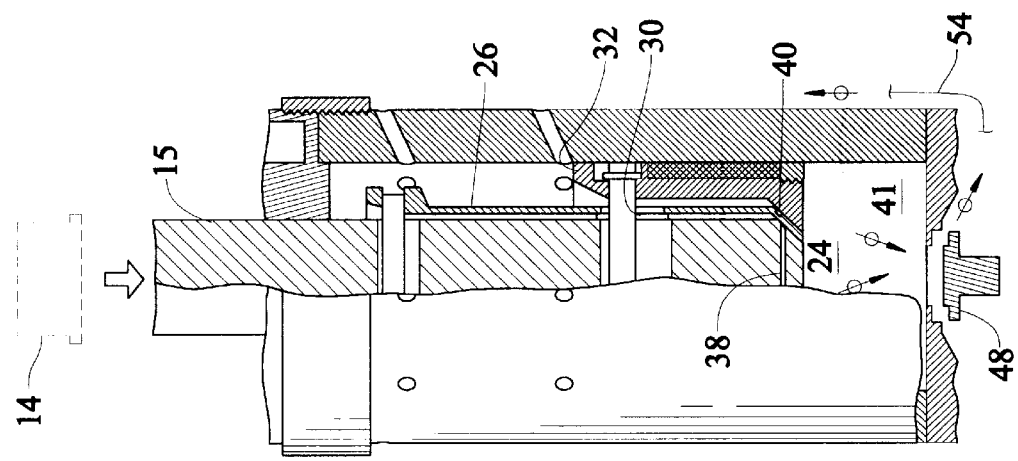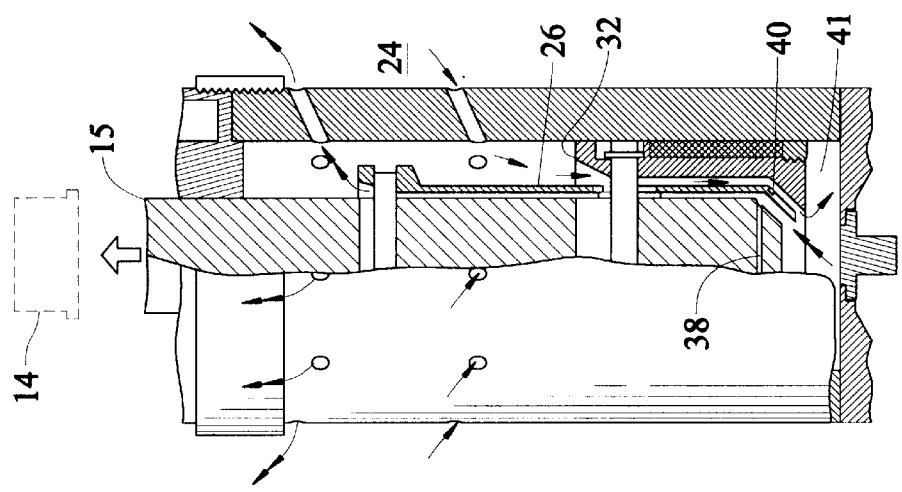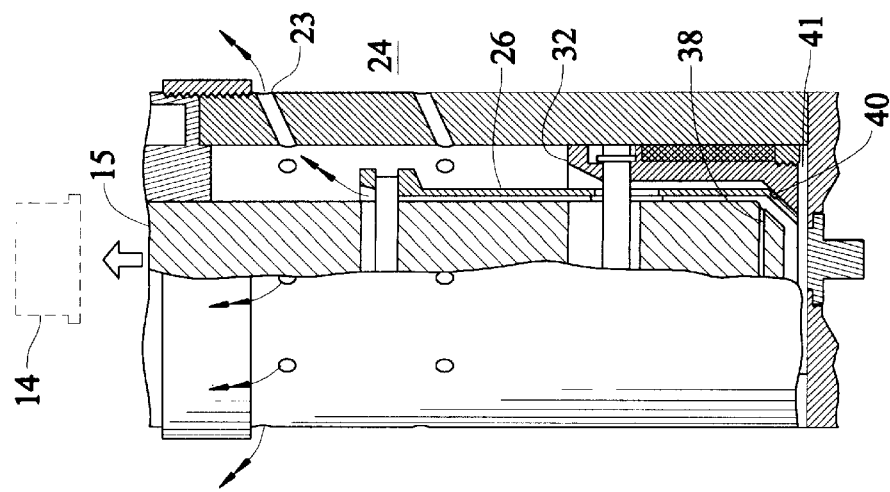

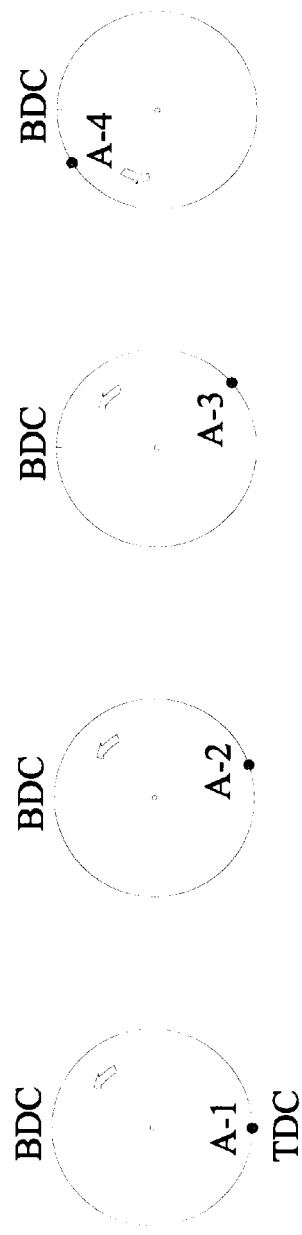

VERY LOW NPSH CRYOGENIC PUMP AND MOBILE LNG STATION

CROSS REFERENCE TO RELATED APPLICATIONS

Priority for the present invention is based upon prior filed Provisional patent application, Ser. No. 60/050,269 of Lewis Tyree, Jr. entitled LOW NPSH CRYOGENIC PUMP MOBILE STATION WITH STORAGE AND VAPORIZING filed on Jun. 20, 1997.

STATEMENT OF FEDERALLY SPONSORED RESEARCH AND DEVELOPMENT

Not Applicable

BACKGROUND OF THE INVENTION

This invention relates to the apparatus and methods suitable for cryogenic pump systems, either mobile or stationary, incorporating a medium or high pressure reciprocating cryogenic pump, operating under difficult conditions where little if any Net Positive Suction Head (NPSH) is available. Examples of such especially difficult pumping applications are small and/or mobile systems and situations where providing NPSH by pressure building of the cryogen storage so as to provide NPSH is not desired. Also difficult are systems pumping to medium (about 1,500 psig) or high (about 3,000 psig or higher) pressures where the heat of compression is great. Start-stop service against medium or high pressures increases the difficulty, if cryogen venting and/or pump priming is not desired, the usual case.

One example incorporating these problems are vehicles using a liquefied low temperature (cryogenic) fuel such as LNG (liquefied natural gas), methane, hydrogen or the like used in on-board cryogenic storage and pumping systems for providing medium or high pressure cryogen vapor for measured, direct injection to the vehicle's engine so as to provide motive power fuel to the vehicle. Unlike normal diesel fuel or gasoline, the desired precise metering and timing injections of cryogen fuel in the liquid form into the engine has not been feasible, therefore injection of pressurized vapor is desirable. Using LNG as an example, the high pressure cryogen vapor would be referred to as compressed natural gas (CNG). Accordingly, the engine of the vehicle on which the system is located may receive it's CNG fuel from the LNG source, but after being pumped to a desired pressure and then vaporized.

Another example incorporating these problems are very small cryogenic liquid systems where it is desired to fill steel high pressure (about 2,500 psig) cylinders with warmed cryogen vapor, using cryogenic liquid stored in small liquid cylinders as the source of the vapor. There are many other examples where very low NPSH reciprocating cryogenic pumps would be of great utility.

While a number of cryogenic pumps have been developed for low NPSH service; the difficulties of providing pumps suitable for an on-board vehicle medium or high pressure cryogenic pump, or for other small pumping systems have proven too great. Onboard cryogenic pumping systems intended to operate while the vehicle is in motion are especially difficult, as the motion of the vehicle (and consequently the cryogen storage tank), tends to make the stored cryogen come to and remain at equilibrium conditions, i.e. boiling from any heat incursion through the tank's insulation. Included in previous low NPSH designs are U.S. Pat. No. 3,011,450 issued Dec. 5, 1961; No. 3,023,710 issued Mar. 6, 1962; No. 3,263,622 issued Aug. 2, 1966; and No. 3,277,797 issued Oct. 11, 1966 —all to the present inventor. In particular the '710, the '622 and '797 patents show pumps where the intake valve into the pumping chamber is caused to open by the mechanical action of the piston rod retracting from a center opening in a hollow piston, a type of action commonly referred to as a "lost motion" action as the piston does not move as far as does the piston rod. This mechanically opening of the intake valve reduces one principal need for NPSH, that of causing the intake valve to open by a reduction in pressure. Another more recent U.S. Pat. No. 5,188,519 issued Feb. 23, 1993 to I. S. Spulgis shows a similar "lost motion" action in opening the intake valve mechanically. However, no cryogenic pump has been totally satisfactory in its operation when handling cryogenic liquids at the very low NPSH encountered in small and/or mobile applications. Attention is directed at the explanation of NPSH contained on page 27of MVE Data Book P/N 10517513 8/96 making the statement that no pump can operate on saturated liquid (zero NPSH) cryogen, a widely held view.

It has long been recognized that LNG and the like could be a most useful fuel for buses, trucks and other transportation systems requiring reciprocating Diesel engines or other types of internal combustion engines. However, the clean burning and efficient Diesel cycle requires substantial injection pressures of its fuel for best overall performance. It is also desired to carry the fuel in the cryogenic liquid state, so as to save the weight and space of high pressure gas cylinders. The desired solution of carrying on-board the LNG as a low pressure liquid, but providing high pressure gas to the engine, is one requiring an on-board cryogenic pump. As stated earlier, the performance of this pump must be quite unusual as the LNG in the storage tank will tend to stay at equilibrium conditions (due to the vibration of the vehicle), thus providing near zero Net Positive Suction Head (NPSH) to the pump's inlet, a condition under which most known medium or high pressure cryogenic pumps cannot reliably operate, especially as the tank becomes nearly empty. Furthermore, for many reasons, it is not desirable to vent to the atmosphere natural gas vapor from the on-board storage and pressurizing system; accordingly the traditional methods/techniques utilized in the cryogenic pump industry to provide prime or NPSH are not appropriate.

The attractiveness of utilizing the cold potential represented by LNG vaporization for some other useful purpose has been long recognized; i.e. U.S. Pat. No. 3,027,727 issued Apr. 3, 1962 to G. F. Farmer and No. 3,363,425 issued Jan. 16, 1968 to R. H. Williamson and many others; but no system has functioned well enough to be accepted and widely used. At the January 1988 Energy Sources Technology Conference and Exhibition, and reported in ASME Paper 88-ICE-21 entitled "LNG (Liquefied Natural Gas) as a Fuel and Refrigerant for Diesel Powered Shrimp Boats", where the vehicle is a boat. U.S. Pat. Nos. 3,685,310 issued Aug. 22, 1972 and 3,740,961 issued Jun. 26, 1973 to H. Fischer describes an ammonia system (characterized as an "open cycle") where the liquid ammonia provides both the cooling for in-transit refrigeration and the resultant gaseous ammonia can be fed to the engine to augment the engine's fuel supply. U.S. Pat. No. 3,823,568 issued Jul. 16, 1974 to T. Bijasiewicz et al describes a system wherein land and water vehicles use a cryogenic fuel which can also cool the passenger compartment. U.S. Pat. No. 5,211,029 issued May 18, 1993 to R. Uselton et al describes a so called "negative energy storage system", for storing a cooling effect for later use. U.S. Pat. No. 5,277,038 issued Jan. 11, 1994 to P. Carr describes a thermal storage system for storing cooling (and/or heating) for later use in cooling (and/or heating) the passenger space of the vehicle in which it is located.

The use of slush carbon dioxide (a mixture of liquid and solid) to store for later use a refrigeration effect has been envisioned in U.S. Pat. No. 4,100,759 issued Jul. 18, 1978; in No. 4,211,085 issued Jul. 8, 1990; in No. 4,224,801 issued Sep. 30, 1980; in No. 4,693,737 issued Sep. 15, 1987; in No. 4,695,302 issued Sep. 22, 1987; and in No. 4,995,234 issued Feb. 26, 1991—all either to the present inventor or with the present inventor as a named inventor. The '234 patent uses the vaporization of LNG to create a useful refrigerating effect, which is stored in the slush mixture by effecting a phase change of some of the liquid carbon dioxide to a solid, for later use.

Even more recently, the U.S. Dept. of Energy (DOE) in a Small Business Innovation Research 1996 Program Solicitation, No. DOE/ER-0686 identified "Liquid Natural Gas Storage for Heavy Vehicles" as a technical topic in which the DOE has a R & D mission. In this Solicitation, on-board medium pressure (approx. 500 psig) and high pressure (approx. 3,000 psig) cryogenic pumps were identified as areas where innovation was specifically desired, as an existing component or practice that requires improvement.

However, and despite these publicized needs, the difficulties inherent to an on-board LNG storage, pumping and vaporizing system/station suitable for medium or high pressure injection of the natural gas into a Diesel engine have prevented such a system from being widely used. Also while many have proposed systems for utilizing the refrigerating effect obtained from vaporizing a cryogenic fuel such as LNG, none also have reached the stage where commercial success resulted. The definition of cryogenic liquid as used herein is a gas whose critical temperature is below terrestrial temperatures; i.e. below about −85° F. Examples are (in the liquid state) nitrogen, oxygen, argon, methane, hydrogen and natural gas (LNG). Where the term LNG is used herein as an example, it equally applies to any liquefied fuel stored at cryogenic temperatures, such as, but not limited to, methane or hydrogen.

BRIEF SUMMARY OF THE INVENTION

The present invention provides a method and system for reliably pumping cryogenic liquids to medium or high pressures under operating conditions, and with results, that no other pump is capable of. Such conditions are referred to as "very low NPSH" conditions.

The key element of this new system is a novel type reciprocating cryogenic pump having both a double piston and a double lost motion feature wherein the pumping chamber is sequentially and mechanically opened through two valves to the inlet. The first valve to open is arranged to preferentially allow any vapor resulting from the previous compression stroke to escape from the pumping chamber before the introduction of low pressure (fresh) cryogenic liquid, and by a path that doesn't subsequently interfere with the flow of the low pressure liquid into the pumping chamber. The second valve to mechanically open is arranged to allow the liquid to flow unimpeded into the pumping chamber, all as caused by gravity and influenced by the funnel like action of the reciprocating piston. To assist in this action, the pump is oriented so that the intake valve mechanisms are generally above the pumping chamber. To minimize the formation of vapor, low frictional heat generating high pressure seals are preferred in areas near the pumping chamber; as well as the use of a very high compression ratio (i.e. low clearance volume) so as to reduce the amount of residual compressed liquid, which tends to flash upon the de-pressurization occurring during intake conditions. By all these means, residual vapor within the pumping chamber is reduced to the point where failure to pump does not occur as long as there is a liquid level in the intake chamber; even though cavitation may occur and while volumetric efficiency may be less than 100%, the pump continues to discharge.

Normal practice with ambient temperature fuels would be to change speed (or stroke) of the fuel pump so as to change its pumping capacity (as well as to cycle on-off) to meet the various fuel rates required by the vehicle's engine—from off to idle to low speed to high speed. However, a cryogenic liquid (such as LNG) stored under conditions where varying equilibrium pressures occurs, possess a wide range of densities, viscosities, and other properties effecting a pump's performance (especially at the equilibrium pressures encountered during on-board storage). Accordingly, after vaporization of the compressed LNG, a storage buffer between the pump and the engine is desirable. This storage can serve, if so desired, to provide natural gas (NG) at a stable temperature and pressure, allowing both timed and metered injection into the Diesel engine.

A second aspect of the invention is to provide the primary vaporization effect of the compressed cryogenic liquid by cooling a phase change material such as liquid carbon dioxide, which changes to a solid at near −70° F. (a warmer temperature than that of the LNG); with this phase change material subsequently providing its stored cooling to a process benefiting from it. The subsequent secondary vaporization can be the result of heat from the atmosphere or from the rejected heat of the engine or both in combination. If the vehicle is carrying refrigerated cargo (or has other cooling needs); the LNG vaporizing system can be arranged so that the refrigeration potential of the LNG is available, if desired, for cargo cooling (or other useful cooling effect), but with the cooling resulting from the fuel vaporization being de-coupled timewise from the cooling use, whereby the fuel supply occurs when the engine requires it, and at least part of the LNG's cooling effect can be stored for later use (thermal storage).

It should be understood that while the invention is described as especially useful for certain mobile LNG applications, there are many other applications involving other cryogenic liquids or liquefied gases where the pump and other elements of the invention would find use.

BRIEF DESCRIPTION OF SEVERAL VIEWS OF THE DRAWINGS

FIGS. 1, 2, 3, and 4 are schematic/sectional views of the reciprocating pumping mechanism embodying various features of the invention, with portions broken away showing the two actions resulting from the double lost motion feature of the invention. FIGS. 5, 6, 7 and 8 are diagramatic views depicting the entire stroke as a circle, with top dead center (defined as the position where the piston rod/pistons are at the closest point to the discharge valve and the pumping chamber at its minimum volume), indicated by the initials TDC and the position of the extreme cold end of the piston rod indicated by a large dot with a designation of A-!, A-2, A-3 or A-4. Bottom dead center is indicated BDC.

FIG. 1 is a partial sectional view, showing the pump as it might be installed in a cryogenic storage tank, just as the pistons are completing their compression stroke, with both intake valves mechanisms are closed and the discharge valve beginning to close because the flow of compressed cryogenic liquid through it is ceasing.

FIG. 2 is a simplified view showing the pumping mechanism just as the suction/intake stroke commences and where the vapor release intake valve mechanism is opening, allowing any cryogen vapor to first escape from the pumping chamber through a dedicated path, thereby not tending to interfere with the subsequent entry of liquid into the pumping chamber.

FIG. 3 is a simplified view showing the pumping mechanism as the suction/intake stroke continues, with the liquid intake valve mechanism opening, allowing the saturated or near saturated (very low NPSH) cryogenic liquid to flow into the pumping chamber, influenced by both the moving piston acting as a funnel and by the tendency for a liquid to flow downwards.

FIG. 4 is a simplified view showing the pumping mechanism as the compression stroke commences, with both the vapor release intake valve mechanism and the liquid fill intake valve mechanism closed, and the compression stroke ready to commence.

FIGS. 9 and 10 are exploded views of parts of the pumping mechanism of FIGS. 1, 2, 3 and 4. is a simplified view of the pump system installed on a tractor unit (vehicle) connected to a refrigerated trailer, wherein the refrigeration effect resulting from vaporizing the LNG is utilized to assist in cooling the refrigerated trailer.

Figure 1:
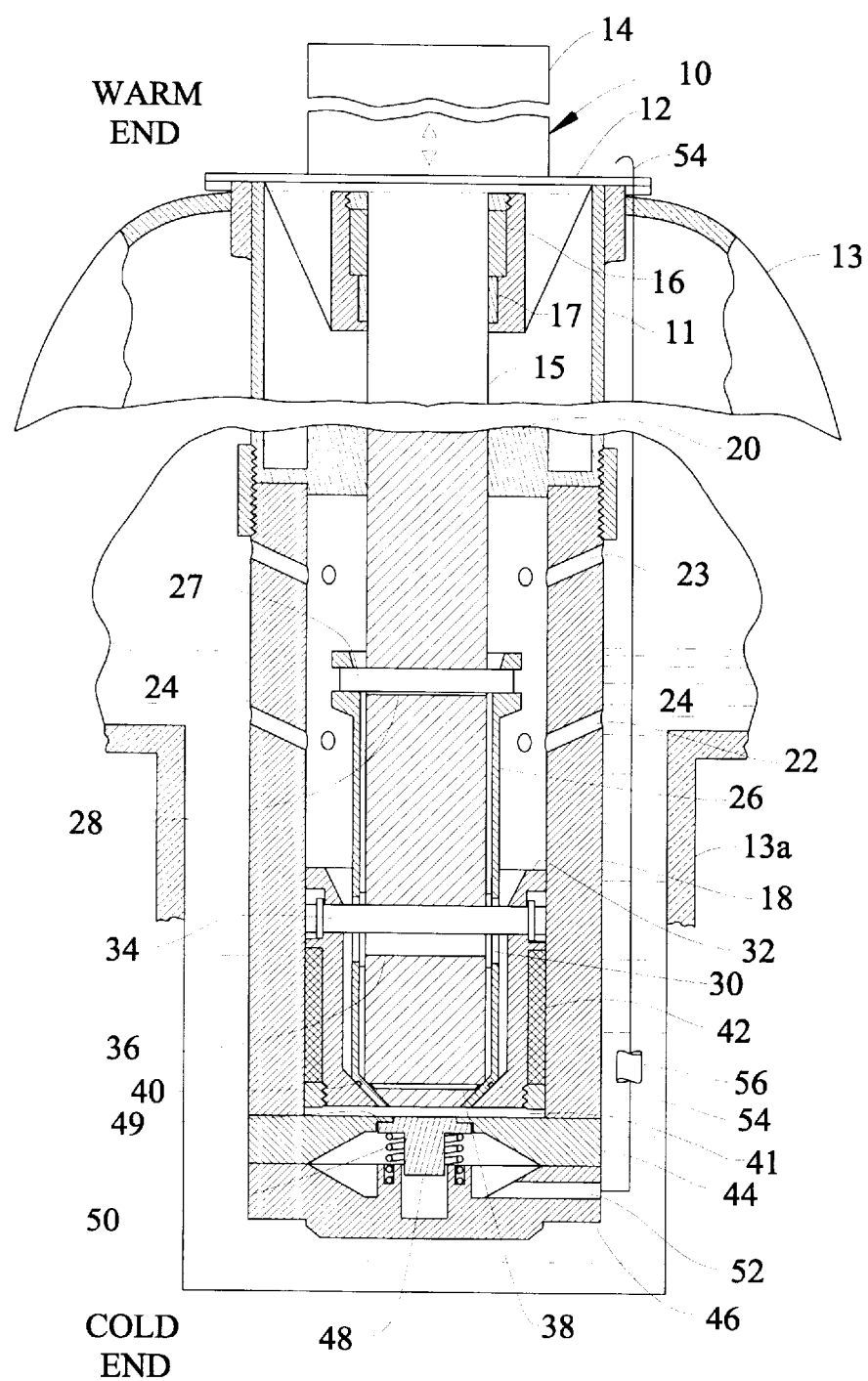

In the drawings that follow, an arrow→represents a cryogenic liquid at storage tank pressure, an arrow with a circle following the head→represents a compressed cryogenic liquid, a double headed arrow→represents the vapor phase resulting from the cryogenic liquid, from either being heated or depressurized.

DETAILED DESCRIPTION OF THE INVENTION

Shown in FIGS. 1, 2, 3, and 4 is the reciprocating cryogenic pump 10 of the invention, but at 4 different stages of the suction and discharge strokes as shown on the circles in FIGS. 5, 6, 7 and 8 respectively.

As best shown on FIG. 1, the pump 10 is comprised of a cylindrical casing 11, mounted at one end to a warm end plate 12 (mounted to a typical insulated cryogenic liquid storage tank 13), on which the reciprocating drive mechanism 14 is mounted. Tank 13 is shown with an optional sump 13a to receive the cold end of pump 10. Drive mechanism 14 can be a rotating drive or a gas or hydraulic driven plunger or bellows type, any as is commonly used in the industry, and is arranged to transmit its reciprocating motion to a piston rod 15. Suitably mounted near the plate 12 and between the inside of the casing 11 and the rod 15 are warm end packing 16 and warm end guide bushing 17. At the opposite end of the casing 11, a pumping cylinder 18 is connected. Cold end guide bushing 20 is suitably mounted between the piston rod 15 and cylinder 18 so as to provide alignment. Liquid inlet ports 22 and vapor outlet ports 23 provide openings in the pumping cylinder 18 for communication with the cryogenic liquid 24 to be pumped from tank 13. Pump 10 is generally mounted either vertically or inclined, with the warm end higher than the cold end, so that liquid 24 tends to flow into and through ports 22 due to gravity. A first round and hollow piston 26 fits over the cold end of rod 15, pin 27 (secured to piston 26) slideably engages and passes through slot 28 in rod 15. Bushing(s) 30 is fastened to rod 15 so as guide piston 26, but containing large vertical serrations (see FIG. 9) so as to not impede the upward flow of vapor between rod 15 and piston 26. A second round and hollow piston 32 fits over both first piston 26 and rod 15, pin 34 (secured to piston 32) slideably engages and passes through slot 36 in rod 15, and through piston 26 and bushing 30 at slots 37a and 37b. Slots 37a and 37b (see FIGS. 9 and 10) are sufficiently large to prevent engagement of pin 34 with piston 26 or brushing 30. The cold end nose of rod 15 is tapered and holds a compression seal 38, which when engaged to the tapered inner nose section of piston 26, forms a seal therewith, preventing flow through. The cold end nose of first piston 26 similarly is tapered and also holds a compression seal 40 (see FIG. 10), which when engaged to the tapered inner nose section of second piston 32, forms a seal therewith, preventing flow through. As the suction stroke begins, with the drive mechanism 14 located by point A-1 of FIG. 5, slot 28 and slot 36 are arranged so that pin 27 is engaged by slot 28 before pin 34 is engaged by slot 36. Accordingly, the initial intake valve to open is that located at seal 38. This allows any vapor in the pumping chamber to escape before the principal liquid intake action begins. As influenced by pin 27, rod 15 and piston 26 move simultaneously, and that action causes the next intake valve to oden, that located at seal 40. Once both intake valves have opened, the rod 15, piston 26 and piston 32 move as one unit through the remainder of the suction stroke, as influenced by pin 27 and pin 34. Liquid cryogen 24 then flows into the pumping chamber 41, unimpeded by vapor egressing. After Bottom Dead Center is passed and the compression stroke begins, the seal 38 of rod 15 engages piston 26, which in turn, by means of seal 40, engages piston 32, so that rod 15, piston 26 and piston 32 move as one unit. Piston 32 contains high pressure seals 42, preferably a principally temperature actuated (they become tight to the walls of cylinder 18 when the pump is cooled down to cryogenic temperatures), labyrinth type and sufficient in length to act as both seals and bushing, all without causing excessive frictional heat, which would cause cryogenic liquid 24 to flash to vapor during the intake stroke. Seals 42 alternately could be located in the walls of cylinder 18, (not shown), rather than in the piston 32. To complete the pump 10, an end plate 44 and a cover plate 46 are fastened to the cylinder 18 by suitable fasteners (not shown). Plate 44 is machined so as to receive discharge check valve 48 and holds discharge valve seat 49. Cover plate 46 is machined so as to guide valve 48 and to hold valve spring 50. Plate 46 contains discharge passageway 52, connecting to discharge line 54, which is suitably insulated with teflon tubing 56. Line 54 in turn proceeds through plate 12 to use. It is important to minimize the clearance volume (and thereby increase the compression ratio), so as to minimize the amount of residual compressed cryogenic liquid at the end of each discharge stroke. Any such liquid remaining in the clearance volume was heated by the work of compression, and will create vapor during the depressurization occurring at the beginning of the suction stroke, too much of which vapor causes pumping problems at the discharge pressures of this pump. Accordingly, a compression ratio of at least about 20 to 1 is desired.

Turning next to FIG. 2, with the drive mechanism 14 located by point A-2, of FIG. 6 the nose seal 38 mounted to rod 15 has moved away from the corresponding surface of piston 26, so that any vapor in the pumping chamber 41 formed from depressurization of high pressure liquid remaining in the clearance volume or from heat, can escape before fresh liquid 24 is introduced, using an independent exit path through ports 23 to the ullage volume of the tank 25, as seal 40 is still engaged against piston 32.

As best seen in FIG. 3, with the pump mechanism located by point A-3 of FIG. 7, as the suction stroke continues, both seal 38 and seal 40 have moved away from the corresponding surfaces of piston 26 and piston 32, and both pistons are moved upwards by the action of rod 15. As this occurs, liquid 24 flows downward into chamber 41, and with vapor free to leave chamber 41 by a separate path, filling chamber 41 with liquid 24 as the suction stroke continues from point A-3 to BDC.

As then seen in FIG. 4, once BDC is passed and point A-4 of FIG. 8 is reached by the pump mechanism, both nose seal 38 and nose seal 40 have moved against the corresponding surface of piston 26 and piston 32 respectively, closing both, and as the rod 15, piston 26 and piston 32 continue the compression stroke, the liquid 24 in the pumping chamber 41 is increased in pressure to the point where discharge valve 48 is forced open, allowing the now high pressure liquid to leave the pump through discharge conduit 54.

Accordingly, as seen in FIGS. 1, 2, 3, and 4, pump could be classified as a double lost motion type, wherein the lost motion, that is the part of the stroke where the rod 15 moves but piston 26 and piston 32 do not move, has two elements. On the suction stroke and beginning at TDC, the initial lost motion occurs when only rod 15 moves, (see FIG. 2) allowing vaporized liquid 24 from the previous stroke (or from other source) to escape from pumping chamber 41, but in a manner so as to not impede the subsequent inflow of liquid 24. This action occurs from TDC to point A-2. The second lost motion occurs immediately following the first lost motion when both rod 15 and piston 26 move (see FIG. 3) allowing liquid 24 to flow into pumping chamber 41. Subsequently, during the suction stroke, rod 15, piston 26 and piston 32 move together. These lost motions occur at both ends of the stroke and thus the length of the actual pumping stroke is less than the length of the stroke of rod 15, a characteristic of such pumps, wherein the intake valve mechanism is opened by the reciprocating action.

Figure 11:
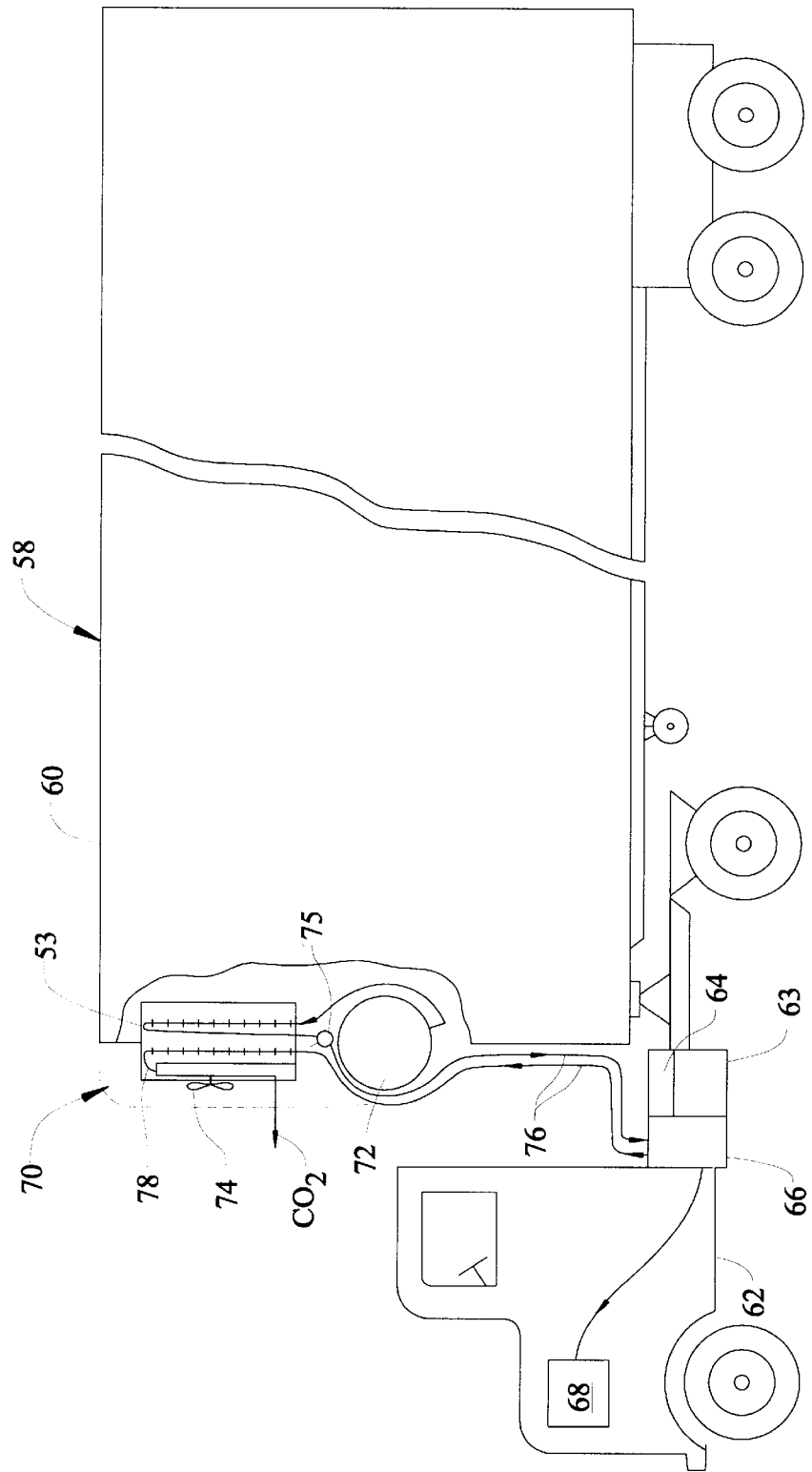

As seen in FIG. 11, one method is shown of using the pump 10 on a refrigerated truck 58 using LNG for motive fuel and an expendable cryogen (such as carbon dioxide or nitrogen) for primary cooling, with an assist from the cooling available from vaporization of the LNG prior to use in the truck engine thereby reducing the cryogen needs.

Truck 58 consists of an insulated trailer 60 connected to a tractor 62, which carries an insulated tank 63 for carrying a supply of LNG (or similar fuel), a pumping module 64 containing a pump 10 (not shown), a vaporizing system 66 containing a suitable phase change material (such as carbon dioxide) and a natural gas fueled engine 68 for supplying power to the tractor 62. Mounted to the nose section of the trailer 60 is a cryogenic cargo cooling system 70, of the general type described in U.S. Pat. No. 4,045,972 issued Set. 6, 1977 to the present inventor (or subsequent variations thereof). The cryogen is stored for use in tank 72, which when required, is allowed to flow through primary coil 73, cooling air circulated through the trailer 60 by the action of fan 74. After the warmed cryogen exits coil 73, three way valve 75 either diverts the gas back to system 70, or using conduits 76 sends it to vaporizing module 66, where it is recooled, and then back to coil 78, where it imparts the cooling potential formerly in the LNG to any cargo in trailer 60. While the system is shown for a tractor 62 and trailer 60 combination, it equally applies to straight trucks. If desired, cooling system 70 can be replaced with a closed cycle mechanical type (not shown) and the stored refrigeration similarly utilized to augment the cooling provided by the mechanical cooling system.

Although the invention has been described with regard to what is believed to be the preferred embodiment, changes and Modifications as would be obvious to one having ordinary skill in both pump design and cryogenic engineering can be made to the invention without departing from its scope. Particular features are emphasized in the claims which follow. The term conduit used in the following claims is to be interpreted broadly to include all passageways.

I claim:

1. In a station for pumping a low NPSH cryogenic liquid to about medium or high pressures, the station comprising:

insulated storage tank means for holding said cryogenic liquid to be pumped and, above said liquid, vapor holding means for the respective vapor phase of said liquid in the ullage volume of said tank means, a reciprocating pump mounted to said tank in an inclined or vertical position having, cylinder means, piston means reciprocally movable within said cylinder means, liquid outlet valve means mounted in a closure attached to the discharge end of said cylinder means, combination valve means for liquid inlet and vapor outlet into and out of said cylinder, piston rod means reciprocally movable generally along the axis of said cylinder means in a direction toward said outlet valve means and in a reciprocal direction causing a compression stroke and then an intake stroke by said piston means to which said rod means is linked, said rod means and said piston means loosely connected so that they form said combination valve means, said cylinder means, said outlet valve means and said closure, said combination valve means and the compression face of said reciprocally moving piston means defining a pumping chamber, said cylinder means, said rod means, said combination valve means, and the intake face of said reciprocally moving piston defining part of an annular intake chamber, conduit or conduits having one end in communication with said liquid in said storage tank means and the other end in communication with said intake chamber or extensions thereof, said conduit or conduits located generally above that portion of said intake chamber that said piston traverses during said intake stroke, drive means attached to the upper end of said rod means for providing a reciprocating motion causing said intake and said compression strokes by said piston means, pressure seal means located between said cylinder means and said piston means so as to reduce leakage between said compression chamber and said intake chamber during said compression stroke, said combination valve means operatively associated with said rod means and said piston means in a lost motion type arrangement, whereby said combination valve means is mechanically caused to open during said intake stroke and to close during said compression stroke, said combination valve means and said intake chamber located above said compression chamber so that when said combination valve means is open, either said liquid can flow downwardly from said intake chamber into said compression chamber, or said vapor can flow upwards from said compression chamber into said intake chamber, all as influenced by gravity or the changes in relative size of said compression and intake chambers and said outlet valve means being a check valve type responsive to the flow therethrough of said liquid caused by said compression stroke or by the lack of flow caused by said intake stroke;

the improvement comprising:

said conduit or conduits consisting of first conduit or conduits and second conduit or conduits, the ends of said first conduit or conduits in communication with said storage tank means at a higher elevation than the ends of said second conduit or conduits, whereby during said intake or compression strokes, said vapor formed in said pump collects in said intake chamber and returns to said ullage volume of said tank means by said first conduit or conduits and said liquid tends to flow into said intake chamber by said second conduit or conduits, thereby the flow of said vapor leaving tending to not impede the flow of said liquid entering, said vapor resulting from said liquid vaporizing due to contact with portions of said pumping chamber that had been warmed by friction of said seals means, or caused by said liquid that had been warmed by the heat of compression but not discharged from said pumping chamber and upon being depressurized during said intake stroke, or caused by heat incursion, or caused by any other reason, thereby reducing the volumetric efficiency of said pump, and whereby any of said vapor, produced during said compression stroke by leakage of said seal means of said liquid thereby passing from said compression chamber to said intake chamber, then returns to said tank means by said first conduit or conduits, thereby not disturbing said liquid about to enter said intake chamber via said second conduit or conduits, said leakage thereby not reducing the volumetric efficiency of said pump.

2. A station according to claim 1, wherein said piston means of said pump forms part of a conduit connecting said intake chamber, said combination valve means and said compression chamber, the portion of said piston means adjacent said intake chamber being shaped so that it dynamically induces flow of said liquid therethrough and into said compression chamber during said intake stroke, whereby the filling of said compression chamber with said liquid is enhanced by the movement of said piston means through said liquid in said intake chamber during said intake stroke.

3. A station according to claim 1, wherein said seal means of said pump contains low frictional heat generation type pressure seal means, whereby heat generation is minimized and thereby heat tending to vaporize said liquid entering said pumping chamber is also minimized.

4. A station according to claim 3, wherein said low heat type seal means include labyrinth type seal means, whereby the sealing effect of said seal means is from a close or a series of close fits rather than pressure induced contact of said seal means with the opposite surface.

5. A station according to claim 4, wherein said labyrinth type seal means and their supports are constructed from materials that maintain a close fit between said piston means and said cylinder means by differential contraction of the materials of construction of said seal means and said cylinder means when operating at cryogenic temperatures, whereby the close fit and reduced seal leakage is enhanced by the low operating temperature of said pump.

6. A station according to claim 1, wherein a vaporizer for warming said pumped cryogenic liquid is provided, whereby said pumped cryogenic liquid can be provided in a gaseous state at about medium or high pressures.

7. A station according to claim 6, wherein said station is located on a vehicle utilizing said pumped cryogenic liquid in said gaseous state as fuel for an engine providing power for a use on said vehicle, whereby said vehicle utilizes said cryogenic liquid as pressurized gaseous fuel for power generation.

8. A station according to claim 7, wherein said vehicle utilizes refrigeration as well as power and wherein said vaporizer includes heat transfer means between said vaporizer and the refrigeration means of said vehicle for utilizing at least some of the refrigeration potential of said cryogenic liquid by said refrigeration means of said vehicle, whereby the refrigeration potential of said cryogenic liquid is employed in providing refrigeration to said vehicle.

9. A station according to claim 8, wherein said transfer means includes a phase change material to accept and store said refrigeration potential for subsequent use by said vehicle, whereby the use of said cryogenic liquid in said gaseous state for both power and for refrigeration can be decoupled timewise.

10. A station according to claim 9, wherein said phase change material is liquid-solid-liquid carbon dioxide, whereby the advantages of non-toxic carbon dioxide can be utilized as said phase change material.

11. A station according to claim 1 wherein said tank means includes sump means in its lower portion to receive the cold end of said pump, whereby said tank may be more fully emptied of said cryogenic liquid by said pump.

12. A station according to claim 1, wherein said pumping chamber has a compression ratio of at least 20 to 1, thereby discharging most of said liquid from said pumping chamber at the end of said compression strokes, whereby reducing the amount of said vapor produced by residual amounts of said liquid flashing upon depressurized by the opening of said combination valve means.

13. An inclined or vertical reciprocating pump for pumping low NPSH cryogenic liquids to about medium or high pressures, the pump comprising:

cylinder means, piston means reciprocally movable within said cylinder means, liquid outlet valve means mounted in a closure attached to the discharge end of said cylinder means, combination valve means for liquid inlet and vapor outlet into and out of said cylinder means, piston rod means reciprocally movable generally along the axis of said cylinder means in a direction toward said outlet valve means and in a reciprocal direction causing a compression stroke and then an intake stroke by said piston means to which said rod means is linked, said rod means and said piston means loosely connected so that they form said combination valve means, said cylinder means, said outlet valve means and said closure, said combination valve means and said the compression face of said reciprocally moving piston means defining a pumping chamber, said cylinder means, said rod means, said combination valve means, and the intake face of said reciprocally moving piston defining part of an annular intake chamber in which said combination valve means is in the lower portion, conduit or conduits having one end in communication with said intake chamber or extensions thereof and the other end in communication with said compression chamber, said conduit or conduits located generally above said compression chamber and are open or closed as determined by the action of said combination valve means, drive means attached to the upper end of said rod means for providing a reciprocating motion causing said intake stroke and said compression stroke by said piston means, pressure seal means located between said cylinder means and said piston means so as to reduce leakage between said compression chamber and said intake chamber during said compression stroke, said combination valve means operatively associated with said rod means and said piston means in a lost motion type arrangement, whereby said combination valve means is mechanically caused to open during said intake stroke and to close during said compression stroke, said combination valve means and said intake chamber located above said compression chamber so that when said combination valve means is open, either said liquid can flow downwardly from said intake chamber into said compression chamber or said vapor can flow upwardly from said compression chamber into said intake chamber as influenced by gravity, or the enlargement of said compression chamber and the contraction of said intake chamber or other reasons and, said outlet valve means being a check valve type responsive to the flow therethrough of said liquid caused by said compression stroke or by the lack of flow caused by said intake stroke, the improvement comprising:
(a) said piston means consisting of a first piston means and a second piston means,
(b) said movable combination valve means consisting of a first combination valve means and a second combination valve means,
(c) said first combination valve means operatively associated with said piston rod means and said first piston means, in a lost motion type arrangement, whereby said first combination valve means is mechanically caused to open during said intake stroke and to close during said compression stroke,
(d) said second combination valve means operatively associated with said first piston means and said second piston means, in a lost motion type arrangement, whereby said second combination valve means are mechanically caused to open during said intake stroke and to close during said compression stroke and
(e) said conduit or conduits consisting of a first conduit and a second conduit;
whereby once both said combination valve means are open, said liquid can flow into said compression chamber without said flow being impeded by the flow of vapor caused by the displacement of said vapor by said entering liquid, as well as vapor created from other reasons, both said first and said second combination valve means alternately opening and closing said first conduit and said second conduit to flow, said first inlet valve means closing said first conduit to flow when said rod means moves in said compression stroke in a direction towards and contacts said first piston means, said second combination valve means closing said third conduit to flow as said rod means and said first piston means continues said compression stroke, causing said first piston means to contact said second piston means, said first and second piston means each having said conduit therethrough generally co-axial with said cylinder.

14. A pump according to claim 13, wherein said first combination valve means opens before said second combination valve means opens, as caused by the motion of said piston rod means as it begins said intake stroke, whereby providing a separate first conduit between said pumping chamber and said intake chamber thereby providing flow path when said first combination valve is open so that said vapor may begin to leave said pumping chamber by a separate conduit before said liquid enters said pumping chamber, and providing a separate second conduit between said pumping chamber and said intake chamber providing a flow path so that said liquid may flow into said pumping chamber essentially unimpeded by said vapor leaving said pumping chamber.

15. A pump according to claim 13, wherein during said intake stroke, the end of said first conduit that is in communication with said intake chamber is at a higher elevation than that of said second conduit that is in communication with said intake chamber, whereby any of said vapor returning to said intake chamber from said compression chamber tends to enter said intake chamber at a higher elevation than said liquid leaving said intake chamber thereby said leaving vapor tending to not impede the flow of said entering liquid.

16. A pump according to claim 13, wherein said second piston means forms part of a conduit connecting said intake chamber, said combination valve means and said compression chamber, the portion of said second piston means adjacent said intake chamber being shaped so that it induces flow of said liquid therethrough and into said compression chamber during said intake stroke, whereby the filling of said compression chamber with said liquid is enhanced by the movement of said second piston means during said intake stroke.

17. A pump according to claim 13, wherein said intake chamber and said pump include connection means to a source of cryogenic liquid to be pumped including a third conduit or conduits and also connected to the vapor phase of said liquid source by a fourth conduit or conduits, said third conduit or conduits connected to said pump at a lower elevation than said fourth conduit or conduits, whereby during said intake stroke the effects of gravity tends to cause said vapor to rise and to leave said intake chamber and said pump and to return to the vapor phase of said source of said source by said third conduit or conduits and tends to cause said liquid to flow into said pump and intake chamber by said fourth conduit or conduits, thereby the flow of said leaving vapor not impeding the flow of said entering liquid, said vapor being caused by liquid vaporizing due to contact with any portion of said pumping chamber that had been warmed by frictional action of said seal means or caused by said liquid that had been warmed by the heat of compression but had not been discharged from said pumping chamber during said compression stroke thereby becoming partially vapor upon being depressurized during said intake stroke or leakage past said seals or caused by heat incursion or caused by any other reason, thereby reducing the volumetric efficiency or causing vapor locking of said pump.

18. A pump according to claim 13, wherein said seal means contains low frictional heat generation type pressure seal means, whereby residual heat does not tend to vaporize said liquid entering said pumping chamber.

19. A pump according to claim 18, wherein said low frictional heat type seal means include labyrinth type seal means, whereby sealing effect is produced by a series of close fits rather than rubbing contact.

20. A pump according to claim 19, wherein said labyrinth type seals and their supports are constructed from materials that form a close fit between the piston and cylinder means upon being cooled to cryogenic temperatures by contracting, whereby the close fit is enhanced by the low operating temperature of the pump.

21. A pump according to claim 13, wherein said pumping chamber has a compression ratio of at least 20 to 1, whereby most of the compressed liquid is discharged from the pumping chamber at the end of each compression stroke, thereby reducing the amount of vapor produced by this residual liquid flashing upon being depressurized by opening of said combination valve.

22. The method of causing a reciprocating pump to fill its pumping chamber with a cryogenic liquid from a source of said liquid under very low NPSH conditions comprising the steps of:

(a) mounting said pump in a vertical or inclined position, (b) mechanically opening a first and a second intake valve, (c) providing an upwardly inclined path or conduit through said opened first intake valve preferentially arranged for cryogenic vapor to exit said pumping chamber and said pump and return to said source, (d) providing a downwardly inclined path or conduit preferentially arranged for said liquid to leave said source and enter said pump at a lower elevation than said upwardly inclined path and to enter said pumping chamber through said mechanically opened second intake valve, whereby said pump both empties said pumping chamber of said vapor and fills said pumping chamber with said liquid to be pumped by utilizing the effects of gravity.

23. The method in accordance with claim 22 comprising the additional step of:

(a) placing said pump in an insulated storage tank in a manner so that by effects of gravity, any of said cryogenic liquid in said tank flows into said pump and pumping chamber and any of said cryogenic vapor from said pumping chamber and said pump flows into said tank, whereby said pump and said tank are one unit and are ready to operate at any time that said liquid is in said tank.

24. The method in accordance with claim 23 comprising the additional step of:

(a) mounting said pump wherein said pumping chamber extends into a sump connected to said tank, whereby said tank may be more nearly emptied of said liquid by said pump.

25. The method of utilizing for a vehicle a first liquid, a cryogenic fuel used both as as a power source for an engine and as a source of refrigeration, and a second liquid, an expendable cryogen used as a source of refrigeration, comprising the steps of:

(a) mounting on said vehicle a first tank for storing said first liquid and a second tank for storing said second liquid, said vehicle containing both said engine capable of utilizing the vapor phase of said first liquid as said fuel and a cooling system using said second liquid as an expendable cryogen as refrigeration source for cooling a portion of said vehicle, (b) providing a system to pressurize said first liquid, (c) connecting the outlet of said first tank and said pressurizing system to a vaporizing system, containing a phase change material, for warming said first liquid and cooling said phase change material, (d) operating said engine and supplying the now pressurized, warmed and vaporized first liquid as said fuel to said engine, (e) connecting said phase change material to said vehicle's said cooling system, (f) connecting said second tank to said cooling system, (g) operating said cooling system so as to provide cooling to said vehicle, utilizing both the cooling available from said second liquid and the cooling available from said phase change material, whereby the pressurized vapor phase of said first liquid is supplied to said vehicle's engine, and cooling resulting from said first liquid's warming and vaporization is subsequently utilized for cooling of said vehicle, and whereby the cooling resulting from said first liquid's vaporization and warming is decoupled timewise from that cooling's use in cooling of said vehicle, and whereby the amount of said second liquid required for cooling of said vehicle is reduced by the amount of cooling obtained from said first liquid's vaporization and warming.

26. The method of claim 25 comprising the additional step of:

(a) providing carbon dioxide as said phase change material, whereby a solid-vapor phase change material at the useful temperature of near minus 70° F. may be employed.

27. The method of claim 25 comprising the additional steps of;

(a) providing liquefied natural gas (LNG) as said first liquid, (b) providing liquefied carbon dioxide or liquefied nitrogen as said second liquid, whereby LNG may be utilized as both a fuel and source of refrigeration for said vehicle, and whereby carbon dioxide or nitrogen may be used as a source of expendable refrigeration for said vehicle.

* * * * *